METHOD OF LOGGING WELLS BY INDUCED DELAYED RADIATION

Original Filed Oct. 18, 1956

*INVENTOR.*
JAMES A. RICKARD,

*BY* John A. Schneider

ATTORNEY.

United States Patent Office

Re. 26,489
Reissued Nov. 12, 1968

26,489

METHOD OF LOGGING WELLS BY INDUCED DELAYED RADIATION

James A. Rickard, Harris County, Tex., assignor, by mesne assignments, to Esso Production Research Company, Houston, Tex., a corporation of Delaware Original No. 2,963,586, dated Dec. 6, 1960, Ser. No. 616,713, Oct. 18, 1956. Application for reissue June 20, 1967, Ser. No. 661,135
4 Claims. (Cl. 250—83.3)

Matter enclosed in heavy brackets [ ] appears in the original patent but forms no part of this reissue specification; matter printed in italics indicates the additions made by reissue.

*ABSTRACT OF THE DISCLOSURE*

*A method of logging wells by induced delayed radiation. Earth formations surrounding a borehole are bombarded with neutrons. A new isotope is produced by the neutron bombardment (chemically identical to one of the chemical elements of which the earth formations are composed). The new isotope is radioactive and decays by beta emission with a characteristic half-life and emits gamma rays of energies characteristic of said beta emission. Such gamma radiation is detected at a selected time interval after bombardment and the intensities thereof are recorded to indicate amounts of said isotope and thereby the amounts of said element.*

Figures 1, 2, 3, 4:
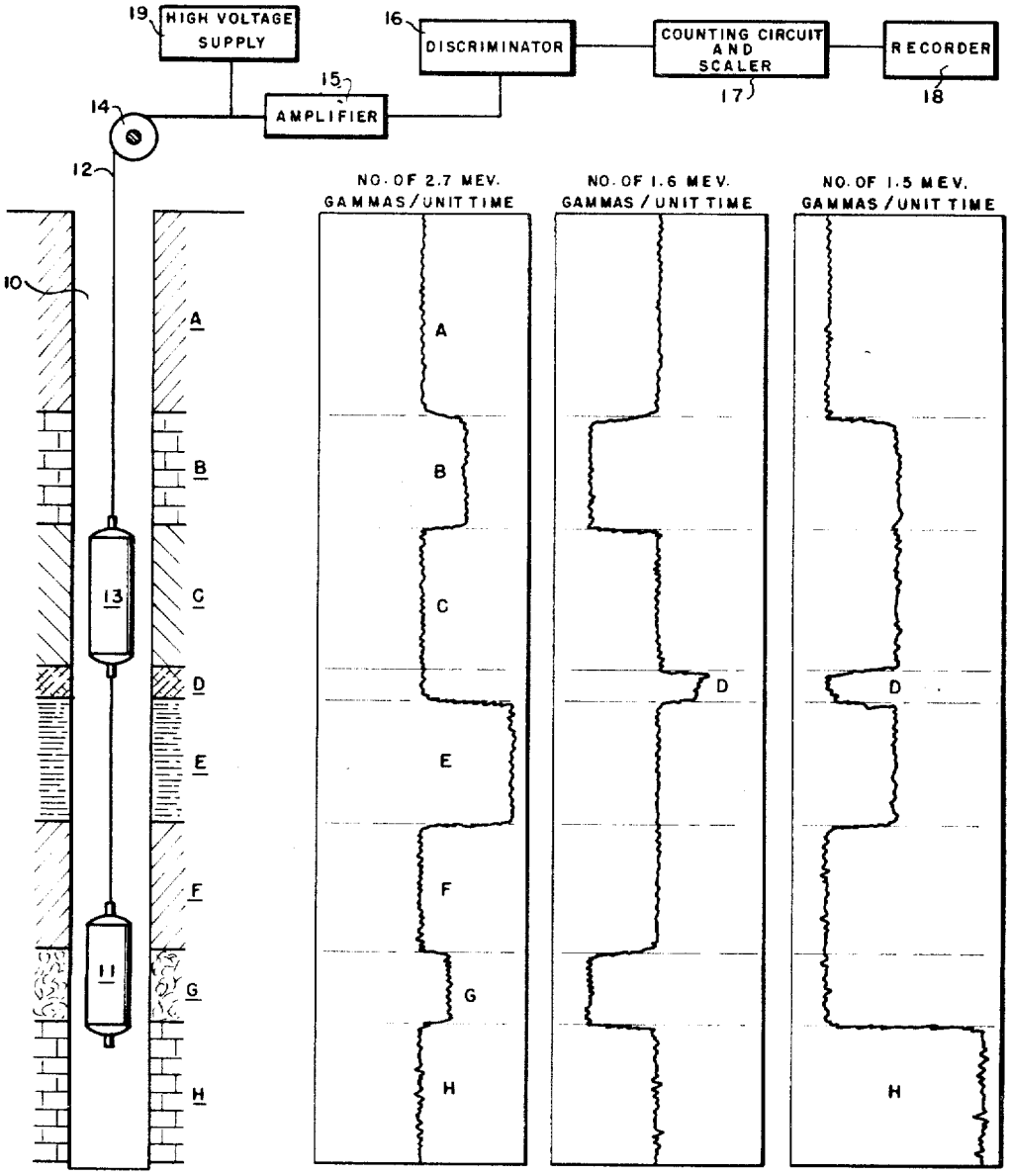

This invention concerns a method for determining the presence and amounts of various chemical elements in subsurface formations. More particularly, this invention is directed to detecting and determining the amounts of chemical elements in subsurface formations by means of induced delayed radiations.

When a subsurface formation is bombarded with a source of radioactive energy, induced radiation is produced which is uniquely characteristic of the chemical elements present in the formation. For purposes herein this radiation may be divided into two types, instantaneous and delayed. By instantaneous induced radiation is meant radiation which takes place earlier than approximately one second after bombardment by the radioactive source whereas by delayed induced radiation is meant radiation which takes place later than approximately one second after bombardment by the radioactive source.

The energy of the induced radiation is characteristic of the chemical elements present in the subsurface formations and the intensity of the induced radiation (number of induced radioactive particles per unit of time) detected adjacent a given formation is a function of the concentration of the chemical element in that formation, the source strength, the detector efficiency, the time elapsed between bombardment and detection, the cross section for the particular nuclear reaction involved, etc. All of these factors except concentration of the chemical element is or may be made constant for a given chemical element from one formation to another.

U.S. patent applications Serial Nos. 504,825 (filed April 29, 1955), *now Patent No. 2,963,587*, and 534,234 (filed September 14, 1955), *now abandoned*, each by J. A. Rickard, are directed to determining the presence and amounts of chemical elements located in subsurface formations by producing, detecting and interpreting instantaneous induced radiation and delayed induced radiation (wherein the interpretation is made relative to decay with time), respectively.

My new method is directed also to determining the presence and amounts of chemical elements located in subsurface formations by producing, detecting and interpreting induced radiation. However, instead of detecting the induced radiation instantaneously after bombardment or at a time after bombardment relative to decay with time, detection of the induced radiation is made a constant time after bombardment of the formation by the radioactive source.

Hence, an object of this invention is to determine the presence and amounts of chemical elements (or the isotopes thereof) in subsurface formations.

Briefly, the method involves logging a borehole to ascertain amounts of selected chemical elements contained in subsurface formations traversed by the borehole wherein a subsurface formation is bombarded with a source of radioactive energy and the induced radioactive energy produced by this bombardment is detected at a selected time interval after bombardment. The time interval selected is dependent upon the half-like of the radiation characteristic of the selected chemical elements and the intensity of the radiation is proportional to the amount of each of the chemical elements present in the formation. Electrical pulses representative of this induced radiation are produced, the magnitude of each pulse being proportionate to the energy of the induced radiation, and pulses of selected magnitude are then recorded. The radiation source is preferably neutrons and the induced radiation detected is preferably gamma rays.

Referring to the drawings:

FIG. 1 shows schematically surface and bore hole equipment which may be employed in performing the steps of my invention.

FIGS. 2, 3, and 4 are plots of number of gammas of selected energies per unit of time versus depth in the borehole.

To more clearly describe the method of this invention reference to the drawings in greater detail will now be made.

FIG. 1 illustrates a borehole 10 traversing a plurality of subsurface formations A—H. A source of radioactive energy 11 is shown suspended on an electrically conductive cable 12. A detector unit 13 is positioned on cable 12, preferably spaced a selected distance above source 11. The cable 12 is arranged about a measuring wheel 14 which latter is adapted to measure the length of cable 12 in the borehole and thereby locating the position of source 11 and detector 13 in the borehole at any time. The cable 12 is connected to an amplifier 15, a pulse height discriminator 16, a scaler and counting circuit 17, and a recorder 18 as shown. A high voltage supply 19 also is connected to cable 12; and, if desired, a gear box (not shown) may be utilized for correlating the recorded selected pulses with the depth of the source 11 and the detector 13. Preferably the source 11 is lowered at a constant rate with the detector 13 positioned a selected distance above the source 11 so that dependent upon the rate of movement of the source 11, the detector 13 will be positioned adjacent or abreast a desired formation at a predetermined time interval after the source 11 was positioned adjacent the same formation. However, if desired, the source 11 and detector 13 may be separately positioned in the borehole at selected time intervals.

FIGS. 2 through 4 illustrate a specific example of the type records which result when detection of specific chemical elements is made at predetermined time intervals after bombardment. Logs employed in determining the presence and amounts of sulphur, oxygen and potassium in various formations traversed by the borehole are shown in FIGS. 2, 3 and 4, respectively. The delayed radiations which are induced by neutron bombardment of the formations are as follows:

Half-life $S^{36}+n \rightarrow S^{37}-5$ min.$\rightarrow Cl^{37}+\beta^{-}+\gamma$ (2.7 mev.)
$O^{18}+n \rightarrow O^{19}-29$ sec.$\rightarrow F^{19}+\beta^{-}+\gamma$ (1.6 mev.)
$K^{41}+n \rightarrow K^{42}-12$ hrs.$\rightarrow Ca^{42}+\beta^{-}+\gamma$ (1.5 mev.)

$\beta^{-}$=beta radiation
$\gamma$=gamma radiation
mev.=million electron volts

To detect sulphur, for example, the detector 13 is brought adjacent any particular formation A—H about 2 minutes after the source 11 was adjacent the same formation. Thus, if the logging speed of the traverse of the borehole were 20 feet per minute the source and detector would be spaced 40 feet part when employing the single cable 12 as shown.

The detector 13 detects the counting rate of each of the three gammas (2.7 mev., 1.6 mev., 1.5 mev.) opposite each formation. These gamma rays produce electrical pulses which are transmitted to the earth's surface on cable 12 where the pulses are amplified by amplifier 15 and selectively transmitted to the scaler and counting circuit 17 via the pulse height discriminator 16 from which they are recorded on recorder 18.

For sulphur, only pulse heights representing 2.7 mev. gammas would be passed by the pulse height discriminator 16 and a recording such as seen in FIG. 2 would be made on recorder 18 upon traverse of the borehole. Since the half-life of oxygen is 29 seconds, and since the detector is positioned adjacent the respective formations 2 minutes after bombardment, the induced gamma radiation produced by oxygen would have virtually disappeared by the time the detector 13 was positioned adjacent particular formations; hence, little or no gamma energy resulting from decay of $O^{19}$ to $F^{19}$ would be detected by the detector 13. Since potassium of isotopic weight 42 has a half-life of 12 hours and since the detector 13 is positioned adjacent a particular formation 2 minutes after bombardment, the number of induced delayed gamma radiation/unit of time (counting rate) resulting from decay of $K^{42}$ to $Ca^{42}$ would be very low; hence, little or no record would result from the induced gamma radiation produced by potassium.

Similarly to the illustration relative to detecting sulphur to obtain the plot of FIG. 3, wherein oxygen is detected, the detector is preferably positioned adjacent the formation approximately 15 seconds after bombardment by the neutron source 11. For potassium (FIG. 4), the detector is preferably positioned adjacent the formation approximately 6 hours after bombardment by the source 11.

The time interval between bombardment and detection should be adjusted for particular elements under consideration. Thus the time interval may be approximately one-half of a half-life as in the examples noted supra for detecting sulphur, oxygen and potassium or any other desired time interval may be employed.

In analyzing these figures, zone E has, as seen in FIG. 2, an unusually large sulphur content; hence the presence of an anhydrite calcium sulphate is indicated. Zone B, as seen in FIG. 3, has an unusually low oxygen content; hence this formation may be a shale saturated with petroleum. Zone D, as seen in FIG. 3, has a high oxygen content and hence may be limestone (calcium carbonate) saturated with water. Zone H has an unusually high potassium content, as seen in FIG. 4, indicating the presence of mica, glauconite, feldspar or some other material having a high potassium content.

As readily seen the method may be employed to log chemical elements other than those illustrated herein. Hence it is to be emphasized that the method is not to be construed as limited to the examples described herein. Also it is to be noted that properly calibrated, FIGS. 2, 3 and 4 will indicate directly the percent sulphur, oxygen and potassium or any other desired chemical element contained in subsurface formations.

It is to be noted that the isotopes of the chemical elements have been indicated herein by the numeral affixed to the element's symbol according to conventional and well known usages.

Having fully described the objects, elements and operation of my invention, I claim:

[1. A method of logging a borehole comprising the steps of bombarding with neutrons the earth formations and fluids contained therein surrounding the borehole, producing by said neutron bombardment new isotopes of the chemical elements of which the formation and contained fluids are composed and producing simultaneously incidental gamma rays which are unwanted and uncounted, said new isotopes being radioactive and decaying after bombardment with characteristic half-lifes, one of which is the half-life of the isotope it is desired to detect, the half-lives of the other isotopes present being either too long or too short to interfere in detection of said desired isotope and emitting gamma rays of energies characteristic of said new isotopes, detecting at a single selected time interval after termination of said neutron bombardment intensities of gamma radiation which accompany said decay and which have an energy lying within a preselected energy range, the time interval and energy range selected being dependent upon the known half-life of the radiation characteristic of the decay of the isotope desired to be detected, and recording the intensity of the gamma rays to indicate amounts of the isotope desired to be detected.]

[2. A method of logging a borehole as recited in claim 1 including detecting at said single selected time interval after said neutron bombardment intensities of gamma radiation which accompany beta decay and which have an energy lying within a preselected energy range.]

*3. A method for logging a borehole comprising the steps of:*

*bombarding with neutrons earth formations and fluids contained therein surrounding the borehole including a first atom of an element which it is desired to detect;*

*producing by said neutron bombardment a new second atom from said first atom and producing simultaneously incidental gamma rays which are unwanted and uncounted, said new second atom having in its nucleus the same number of protons as and one more neutron than said neutron bombarded first atom, said new second atom being radioactive and decaying by beta emission following bombardment with a characteristic half-life and emitting gamma rays of energies characteristic of said beta emission;*

*detecting at a single selected time interval after termination of said neutron bombardment intensities of gamma radiation which accompany decay of said new second atom and which have an energy lying within a preselected energy range, the time interval and energy range selected being dependent upon the known half-life of the radiation characteristic of the decay of said new second atom resulting from bombardment of said first atom of said element desired to be detected; and*

*recording the intensities of the gamma rays to indicate amounts of said new second atom and thereby the amounts of said first atom desired to be detected.*

*4. A method as recited in claim 3 in which said first atom is an atom of sulfur$^{36}$ and said new second atom is an atom of sulfur$^{37}$ and the neutron bombardment reaction is:*

$$S^{36} + n \longrightarrow S^{37} \xrightarrow{5\ min.} Cl^{37} + \beta + \gamma\ (2.7\ mev.)$$

*5. A method as recited in claim 3 in which said first atom is an atom of oxygen$^{18}$ and said new second atom*

*is an atom of oxygen*[19] *and the neutron bombardment reaction is:*

$$O^{18} + n \longrightarrow O^{19} \xrightarrow{29\ sec.} F^{19} + \beta + \gamma\ (1.6\ mev.)$$

*6. A method as recited in claim 3 in which said first atom is an atom of potassium*[41] *and said new second atom is an atom of potassium*[42] *and the neutron bombardment reaction is:*

$$K^{41} + n \longrightarrow K^{42} \xrightarrow{12\ hr.} Ca^{42} + \beta + \gamma\ (1.5\ mev.)$$

References Cited

The following references, cited by the Examiner, are of record in the patented file of this patent or the original patent.

UNITED STATES PATENTS

| | | |
|---|---|---|
| 2,303,688 | 12/1942 | Fearon. |
| 2,508,772 | 5/1950 | Pontecorvo. |
| 2,665,385 | 1/1954 | Herzog. |
| 2,692,949 | 10/1954 | MacKnight. |
| 2,752,504 | 6/1956 | McKay. |
| 2,776,378 | 1/1957 | Youmans. |

FOREIGN PATENTS

| | | |
|---|---|---|
| 724,441 | 2/1955 | Great Britain. |

ARCHIE R. BORCHELT, *Primary Examiner.*